United States Patent [19]
Grosskopf

[11] 3,773,974
[45] Nov. 20, 1973

[54] METHOD AND APPARATUS FOR MEASUREMENT OF SPURIOUS VOLTAGES IN VIDEO SIGNALS

[75] Inventor: Herbert Grosskopf, Neukeferloh, Germany

[73] Assignee: Rohde & Schwarz, Muenchen, Germany

[22] Filed: Apr. 23, 1971

[21] Appl. No.: 136,959

[30] Foreign Application Priority Data
Apr. 25, 1970 Germany............... P 20 20 312.7

[52] U.S. Cl. ........................... 178/6, 178/DIG. 4
[51] Int. Cl. ............................................ H04n 5/24
[58] Field of Search................ 178/DIG. 4, DIG. 12, 178/6.8, 7.2; 325/67, 322, 323, 363, 480

[56] References Cited
UNITED STATES PATENTS

| | | | |
|---|---|---|---|
| 3,516,751 | 6/1970 | Fruengel | 178/6.8 |
| 2,885,470 | 5/1959 | Bartelink | 178/DIG. 4 |
| 2,620,438 | 12/1952 | Cotsworth | 325/363 |
| 3,214,692 | 10/1965 | Karpinsky | 325/363 |
| 3,401,331 | 9/1968 | Mussulman | 178/DIG. 4 |
| 3,506,915 | 4/1970 | Harris et al. | 325/363 |
| 3,302,116 | 1/1967 | Free | 325/363 |

Primary Examiner—Robert L. Griffin
Assistant Examiner—Joseph A. Orsino, Jr.
Attorney—Hill, Sherman, Meroni, Gross & Simpson

[57] ABSTRACT

A method and apparatus for the measurement of spurious voltages in video signals by the utilization of blanking periods in which no fluctuations in time occur in the image signals other than those of the spurious signals, in which method the interference signals are so amplified that a constant spurious voltage is produced, and simultaneously therewith so amplifying an indicating signal, whereby a measuring voltage proportional to the amplification results, and in which portions of video signals may be utilized which are proportional to the white value of the video signal whereby the magnitude of the resulting amplified measuring voltage is proportional to the white value and invertedly proportional to the spurious voltage.

7 Claims, 3 Drawing Figures

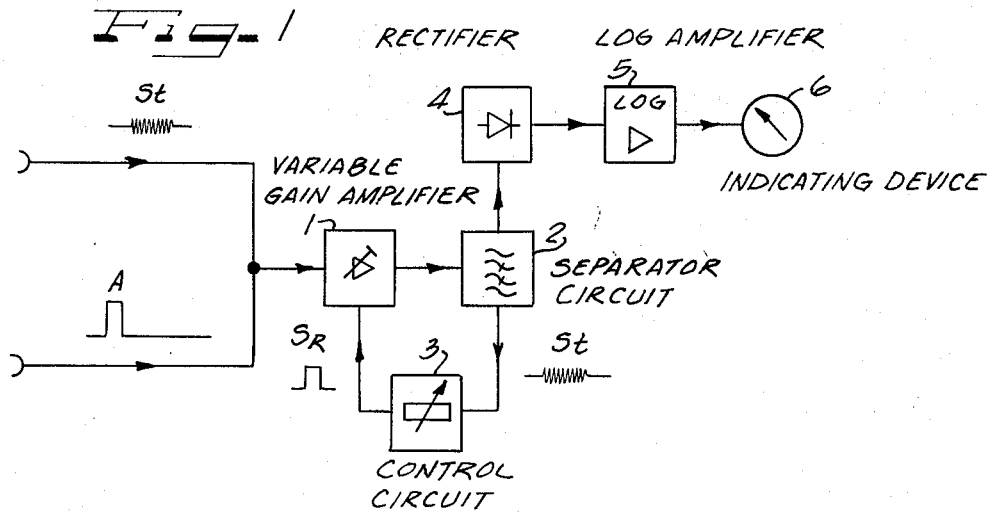
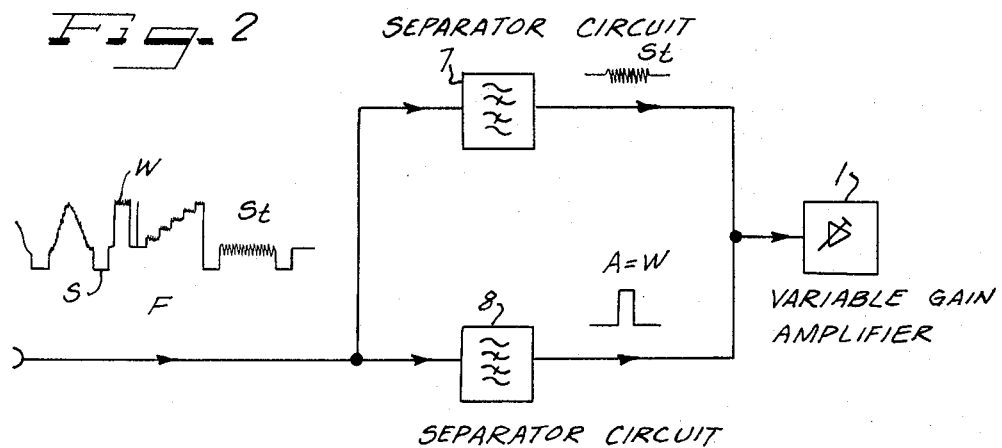
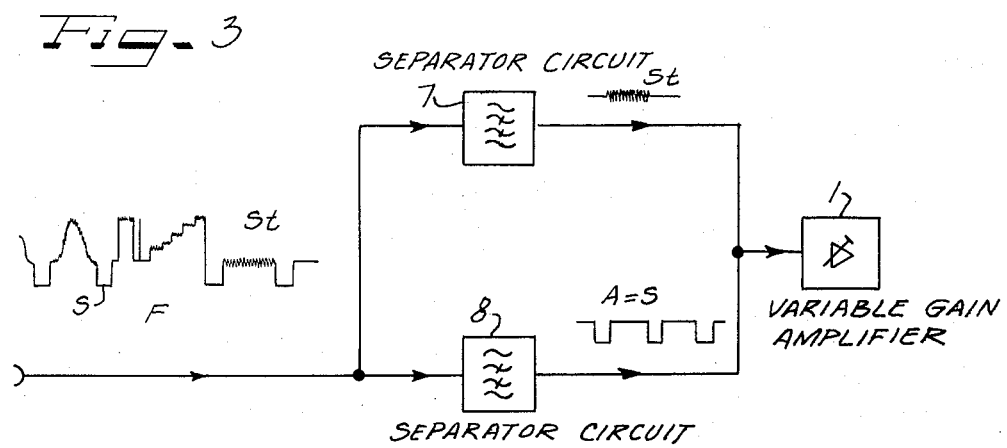

METHOD AND APPARATUS FOR MEASUREMENT OF SPURIOUS VOLTAGES IN VIDEO SIGNALS

BACKGROUND OF THE INVENTION

The invention is directed to a method for measuring spurious voltages in video signals by blanking certain time periods during which no fluctuation in time occurs in the image signal other than that of the spurious signal involved.

The measurement of spurious voltages superimposed on video signals has become of considerable significance in television as the spurious voltages often impose a limit on the quality obtainable in the resulting video image. This is particularly true with respect to noise voltages. Known methods for measuring spurious voltages, particularly noise voltages, have been based on the blanking out of the spurious voltage portion from the test signals which in the blanked-out signal range exhibit no fluctuations in time other than the spurious, or with respect to individual lines of the vertical interval. The interference impulses so obtained are then amplified, suitably rectified and indicated or measured on a suitable instrument (see Measurement of Noise in Video Systems by R. Feldt, Journal of the SMPTE, Apr. 1968, Vol. 77, and some new methods and instruments in television measuring technique, by L. E. Weaver, Radio Eng. Reports 1961, volume 1).

To obtain a rectification which is to a large extent independent of the input amplitude, a calibrated attenuator is utilized in all of the known methods ahead of the measuring amplifier, and following adjustment of the attenuation to obtain a constant voltage at the output of the measuring amplifier following the rectifier, the magnitude of the noise potential or the signal to noise ratio can be read on the attenuator. More recently, efforts have been made to automate these known measuring methods, i.e. to replace the necessary typical attenuator, originally manually adjustable, by attenuators which automatically adjust to produce a constant spurious voltage at the rectifier (see Automatic measurement of the signal relation — distortion in the interval of the cancellations of the image of a television signal, Electronics and Telecommunications, No. 1, 1969, page 2–11). Such attenuators however are very expensive and require similarly expensive logic circuits for their operation. Irrespective thereof, however, they still operate comparatively slowly, particularly when it is noted that there is available for the measurement of the spurious voltages only a few tenths of 1 percent of the duration of a picture signal, as will normally be the case, for example, in the measurement of interference voltages in vertical interval test lines or other similarly short picture sections. Consequently a continuous indication of the readings is not possible with such arrangements. A further disadvantage is the fact that in all of the prior methods the video signal always must be initially leveled exactly at the input of the measuring instrument when the value indicated actually should correspond with the signal to noise ratio.

The invention is directed to the problem of developing a measuring instrument which is suitable not only to measure spurious voltages in the usual manner but which also is utilizable as a measuring unit for automatic measuring equipment. This requires primarily that the reading be produced in the form of a DC voltage which fluctuates according to the spurious voltage and whose magnitude is in each case related to the white value of the video signal. As the magnitude of spurious voltages can fluctuate over several orders, the measuring instrument preferably should effect a logarithmic evaluation of the spurious voltage, and if possible it should even indicate immediately the logarithmic distance between the spurious voltage and the white value of the video signal. In other words, the DC voltage which indicates the reading should be proportional to the white level an inversely proportional to the spurious voltage. The cost of the measuring instrument and its indicating speed should be comparable with corresponding data of other measuring units of the type utilized in automatic measuring equipment, for example, with data or measuring units for non-linear distortions, linear distortions, levels, etc. These results cannot be obtained with prior methods and apparatus.

BRIEF SUMMARY OF THE INVENTION

The present invention solves the problem by feeding the blanked spurious signals into a variable-gain amplifier, whose amplification is continuously regulated in response to the magnitude of the spurious signals in such a manner that a constant spurious voltage is produced at the amplifier output, and simultaneously therewith an indicating signal is conducted over the variable-gain amplifier which produces at the output of the amplifier a voltage proportional to the amplification thereof.

Consequently, in accordance with the invention, a measuring magnitude is created by the indicating signal which passes simultaneously with the spurious signal over the variable-gain amplifier, whose amplitude thus is inversely proportional to the spurious voltage at the input of the amplifier, and must be so if the variable-gain amplifier maintains the spurious voltage at its output constant independently of the input spurious voltage. Likewise, the magnitude of the indication is directly proportional to the spurious range which, as is known, is defined as the relation of the white level present at the input of the variable gain amplifier to the spurious voltage present at the input. In a further embodiment of the invention, the indicating signal present at the output of the variable-gain amplifier may, if necessary, be rectified following separation from the spurious signal and conducted over a logarithmic amplifier to a potentiometer calibrated in dB or Nepers, whereby such indicating signal provides a direct indication of the spurious range directly in logarithmic units. Likewise, if the indicating signals are taken from the video signal which are proportional to the white level of such signal, the indicated spurious range will always be related to the white level of the signal independently of the input level of the video signal.

BRIEF DESCRIPTION OF THE DRAWING

In the drawings, wherein like reference characters indicate like or corresponding parts:

FIG. 1 represents a block diagram illustrating apparatus employing the method of the invention;

FIG. 2 illustrates in similar manner how an indicating signal may be derived from the video signal, utilizing a white impulse; and FIG. 3 is a diagram similar to FIG. 2 illustrating the use of the synchronizing portion of the video signal to derive the indicating signals.

DETAILED DESCRIPTION OF THE INVENTION

Referring to the drawing and more particularly to FIG. 1, the spurious signals may be derived by a suitable blanking operation in accordance with known techniques and fed, with an indicating signal A, into a variable gain amplifier 1, the output of which is connected to a suitable separator circuit 2 with the separated spurious voltage St being fed to a suitable control circuit 3, which may include suitable rectifying means whereby a control voltage SR is produced, which in turn is supplied to the gain control circuit of the amplifier 1 to control the amplification of the amplifier whereby the interference voltage present at the output of the amplifier is substantially constant. Unless the indicating signal A is a D.C. voltage, it is rectified with the rectifier 4 to provide a D.C. voltage which is then conducted to a logarithmic amplifier 5, the output of which is connected to a suitable measuring device or instrument 6, which, for example, can be calibrated in dB or Nepers, in relation to the white level of the video signal at the input of the apparatus. Such a measuring instrument may be either a digital or analog type of apparatus.

Any signal which is separable from the spurious signal St may be employed as the indicating signal A. When the variable gain amplifier 1 is a D.C. amplifier, it will be expedient to also use a D.C. voltage as the indicating signal A. Otherwise this function can be accomplished by one or more impulses occurring during intervals not utilized for the measurement. Likewise, a continuous sine oscillation also may be used if its frequency is outside the spectral area involved of the spurious voltage to be measured.

In accordance with the invention a value of the indicating voltage proportional to the white level of the video signal F and thus an indication of the spurious range, independent of the input level of a video signal, may be obtained, for example as illustrated in FIG. 2. In this arrangement there is derived from the video signal F from which the spurious voltages St are obtained by means of a suitable separator circuit 7, the white impulse W of a vertical interval test signal (vits) or other testing signal proportional to the white value of the video signal F by means of an additional separator 8, which is utilized as the indicating signal applied to the input of the variable gain amplifier 1. As the spurious voltages St, particularly noise voltages, almost exclusively fall outside the sync signal range, it is possible, as illustrated in FIG. 3, to utilize in lieu of the white impulse W the synchronizing signal S as the indicating signal A. If necessary or desirable, however, any other section of the video signal F, which is proportional with the white level, is suitable as an indicating signal A in order to achieve an independence of the spurious range reading from the level of the video signal F.

The speed of adjustment of the present method and apparatus depends only on the control speed of the variable-gain amplifier 1 and thus is considerably higher than that of prior methods, making possible completely new applications of the measurement of spurious voltages in television. For example, with the present invention it is possible to measure the spurious voltages, without special test patterns, in an picture signal just transmitted even if for a short time there is only a gray image spot. This is of particular interest in practical operations as in this way the noise of the entire television transmission path from the camera to the receiver can be accurately checked. In view of the importance of such measurements for practical operations, the time-wise position of the spurious impulses employed can also be so determined that the time intervals of the spurious signals fed to the variable gain amplifier are derived from the voltage impulses of a photo-element or cell placed at a suitable location on the image screen of a television receiver.

The method and apparatus of the invention may be readily utilized for the measurement of all spurious voltages in video signals and may be applied, in like manner, to measure statistical periodic and impulse-like spurious voltages.

I claim as my invention:

1. A method of measuring spurious interference voltages in video signals, utilizing blanking periods in which no fluctuations in time occur in the picture signals other than those of the spurious signals, comprising the steps of variably amplifying spurious signals occuring during such a blanking period to produce a constant spurious voltage, providing an indicating signal having a constant magnitude proportional to a selected portion of the video signal and simultaneously amplifying such indicating signal with said spurious signals, whereby the magnitude of the resulting amplified indicating signal is proportional to the effected amplification, and thus is inversely proportional to the magnitude of the spurious voltage prior to amplification, and a representative measurement thereof.

2. A method according to claim 1, wherein portions of a video signal proportional to the white level thereof are used as the indicating signal, whereby the magnitude of the indicating signal is proportional to the white level.

3. A method according to claim 1, comprising the further step of rectifying the intially amplified indicating signal, logarithmically amplifying the rectified signal, and measuring the logarithmically amplified signal.

4. A method of measuring spurious voltages according to claim 2, comprising the further step of deriving the time intervals of the spurious signals from voltage impulses produced from a photo-cell scanning of a predetermined point located on a television picture tube.

5. An apparatus for measuring spurious voltages in video signals, comprising means for deriving an indicating signal having a constant magnitude proportional to a selected portion of the video signal, a variable-gain amplifier having an input to which the spurious signals and timed indicating signals are to be supplied, a separating circuit operatively connected to the output of said amplifier operative to separate the amplified spurious signals from the amplified indicating signals, means connecting said amplifier and said separating circuit, including means for rectifying the spurious signal derived from said separating circuit and feeding the same to said amplifier as a control voltage to thereby control the gain of said amplifier, whereby a constant spurious voltage results at the amplifier output and the amplified indicating signal forms a measuring voltage proportional to the amplification of said amplifier, and thus inversely proportional to the spurious voltage prior to amplification.

6. An apparatus according to claim 5, comprising in further combination, means connected to said separating circuit for rectifying the amplified indicating signal, and further means connected to said rectifying means for indicating the magnitude of such rectified voltage.

7. An apparatus according to claim 5, wherein said indicating signal is a D.C. voltage and said variable-gain amplifier is a D.C. amplifier.

* * * * *